Dec. 12, 1944.    F. R. McFARLAND    2,364,988

DRIVE MECHANISM

Filed Nov. 30, 1942

INVENTOR.
FOREST R. McFARLAND
BY
Tibbetts & Hart
ATTORNEYS

Patented Dec. 12, 1944

2,364,988

UNITED STATES PATENT OFFICE 2,364,988

DRIVE MECHANISM

Forest R. McFarland, Huntington Woods, Mich., assignor to Packard Motor Car Company, Detroit, Mich., a corporation of Michigan Application November 30, 1942, Serial No. 467,293

5 Claims. (Cl. 64—27)

This invention relates to drive mechanism and more particularly to a driving connection.

In some engines the cam shaft is driven from the crankshaft by a gear train and gear trains driven from the crankshaft are often employed to drive engine accessories, such as the fan, the water pump and the super-charger blower. Sudden torque impulses and crankshaft vibration will be transmitted to such gear trains causing marring and destruction of gear teeth unless damping is provided. These undesirable conditions in the gear trains have been overcome by the use of an elastic drive connection and, for an example, reference may be had to Patent No. 2,342,989, issued February 29, 1944.

Elastic drive connections do not damp vibrations inherent or induced in the gear trains by the associated camshaft or accessory, and it is the purpose of this invention to provide means in the drive mechanism for damping these vibrations, such damping means preferably forming a part of the elastic drive connection.

An object of the invention is to provide drive mechanism with a drive connection in which friction and elastic means damp vibrations of various magnitudes encountered in the driving range.

Other objects of the invention will appear from the following description taken in connection with the drawing, which forms a part of this specification, in which.

Figure 1:
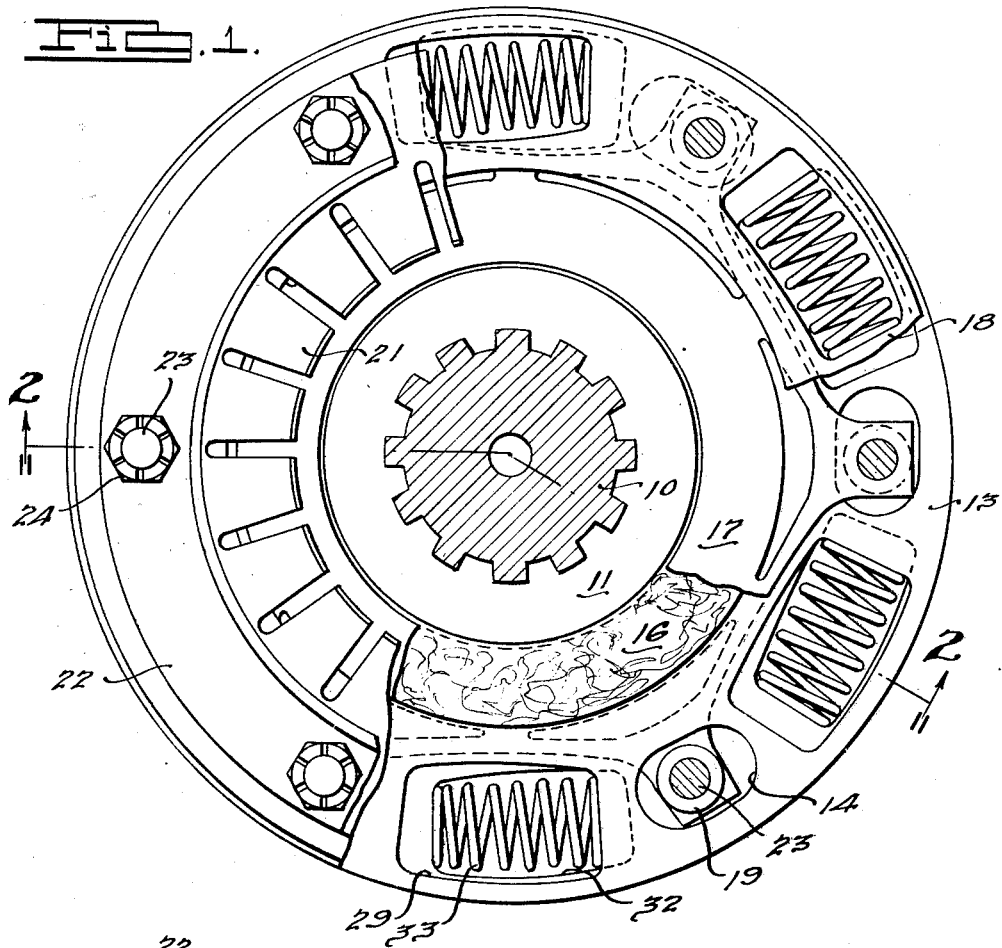
Fig. 1 is an end elevational view of drive mechanism incorporating the invention, portions being broken away to show various elements.
Figure 2:
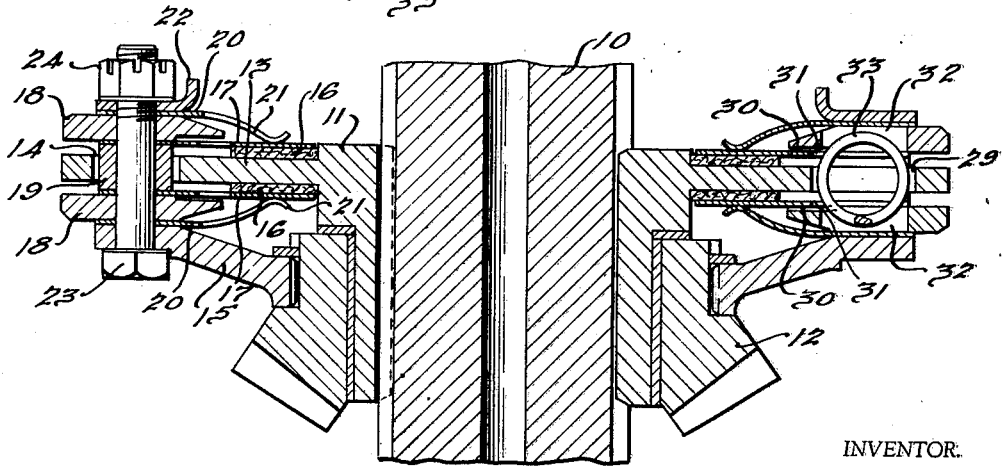
Fig. 2 is a sectional view of the drive mechanism taken on line 2—2 of Fig. 1.

In the drive mechanism illustrated, there is a driving portion, which can be the shaft 10 and hub 11 splined on the shaft, and a driven portion which can be the gear 12. An engine (not shown) is connected to rotate the shaft and the gear can form a part of a gear train (not shown) connected to drive a desired device such as a camshaft or an engine accessory (not shown).

A drive connection is provided between the driving and driven portions of the mechanism that will permit limited relative rotative movement thereof in a manner substantially eliminating torsional surges. The hub is provided with a radially extending disk flange 13, referred to as a driving disk having a plurality of arcuately extending openings 14 therethrough arranged on a circle. The gear has a disk 15 splined thereto and extending generally at a slight angle to the hub flange but parallel therewith at the perimeter portion. The drive connection is arranged to transmit rotational movement from the driving disk 13 to disk 15 through elastic coupling means.

Ring members 18 are arranged on opposite sides of disk 13 and cylindrical sleeve spacers 19 extend through openings 14 in the driving disk and are arranged intermediate the ring members 18. Bolts 23 extend through disk 15, ring members 18 and spacers 19 and are held in operative position by nuts 24. Openings 14 through which the spacers and bolts project extend arcuately in the driving disk 13 and their end terminals define the arc in which the driving disk can move relative to the driven disk 15. The ring members 18 are formed with arcuately extending openings 32 that overlie arcuately extending openings 29 in the driving disk, and coil springs 33 serve as coupling means between the driving disk and the ring members and are arranged to lie in such overlying openings. The openings 29 and 32 are substantially similar in length and register when the drive mechanism is at rest so that the ends of the coil springs bear against the walls forming the end terminals for such openings, the springs being of sufficient diameter and length for this purpose.

Torsional impulses and vibration imparted by the shaft to the driving disk will be absorbed by the springs. The springs will be compressed between the disk 13 at one end and the clamp rings 18 at the other end, as shown in Fig. 1, to damp out transmission of torsional impulses and vibrations to the driven gear 12.

Means is associated with the drive connection for damping vibrations in the gearing, of which the gear 12 forms a part, and the arrangement is such that the drive means, in effect, forms a damper flywheel. A pair of friction rings 16 are arranged adjacent the base portion of the faces of the driving disk and are held in frictional engagement therewith by the plates 17. The rings 16 can be formed of bronze or some other suitable friction material while the plates 17 are formed preferably of metal having some resiliency. The ring members 18 are utilized to clamp plates 17 against the ends of the cylindrical spacer sleeves 19 when the drive connection is assembled in operative relation. The plates 17 are loaded to engage the friction rings with the driving disk by means in the form of constant spring rate disks 20 having bent fingers 21 bearing against the plates 17. These disks 20 lie adjacent the outside faces of the clamp ring members 18, one of the ring members being engaged by disk 15 and the other being engaged by a retainer ring 22. The bolts 23 extend through the retainer ring, the disks 20 and the plates 17, as well as the rings 18 and the spacer sleeves 19, as previously described, and are secured tightly together when the nuts 24 are turned down on the bolts.

The fingers 21 of the spring disks are free and, as they have a constant spring rate, they will exert uniform pressure so that the pressure load of the friction rings with the plates 17 and the driving disk will be constant. A desired spring rate can be obtained by the design and construction of the disks 20. The clap rings 18 are relieved around the inner portion of the end faces adjacent the plates 17, as indicated at 30, to permit flexing of the plates when required. Due to manufacturing inaccuracies, these plates must sometimes be flexed by the fingers of the spring disks to properly load the friction disks, and as the clamp rings are relieved, such flexing by the spring disk fingers can be done with less effort than would otherwise be required.

The force applied by spring disks 20 creates sufficient frictional engagement of rings 16 with the driving disk to dampen vibrations of the gear 12 and the driven disk 15. The pressure applied against the friction rings can be uniformly maintained by the construction and arrangement of the spring disks exerting constant load. The elastic drive connection will smooth out torsional impulses and vibration developed in the drive shaft so that they will not be transmitted to the driven gear, and the friction means will damp vibration in the driven gear. Thus, the elastic drive and the damping means structure serves to preserve the teeth of the gear train, of which gear 12 is the driver, so that they will not become marred or destroyed.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a drive mechanism, a driving disk having arcuately extending openings therethrough, a driven disk, friction rings adjacent opposite faces of the driving disk, flexible plates outside of the friction rings, clamping rings outside of the plates having relieved inner portions in the faces adjacent the plates into which the plates can be flexed, spring disks outside of the clamp rings bearing against the plates to engage the friction rings with the driving disk, spacer means between the plates and extending through the openings in the driving disk, a retainer ring outside of one of the spring disks, the other spring disk being adjacent the driven disk, and bolts extending through the spacers, the retainer, the driven disk, the spring disks, the clamp rings and the plates to secure them together.

2. In a drive mechanism, a driving disk having two sets of arcuately extending openings therethrough, a driven disk, vibration damping friction rings adjacent the inner portion of the opposite faces of said driving disk, plates outside of the friction rings, spacers extending through one set of openings in the driving disk against which the plates are clamped, clamp rings engaging the plates, said clamp rings having arcuately extending openings therethrough adapted to register with a set of openings in the driving disk, coil springs in such registerable openings, spring disks outside of the clamp rings exerting pressure against the plates to engage the friction rings with the driving disk, and securing means extending through the spacers and holding the plates, rings and disks to rotate with the driven disk.

3. In a drive mechanism, a driving disk having arcuately extending slots through the perimeter portion, a driven disk spaced from the driving disk, vibration damping friction rings adjacent the base portions of the end faces of the driving disk, plates outside of the friction rings substantially paralleling the driving disk, spacers extending through the slots in the driving disk, clamp rings holding the plates against the ends of the spacers, spring disks outside of the clamp rings, and bolt means extending through the spacers and clamping the driven disk, the spring disks, the clamp rings and the plates together, said spring disks having free finger portions bearing against the plates to hold the friction rings against the disk under a predetermined load.

4. In a drive mechanism, a driving disk having arcuately extending openings therethrough, a driven disk, friction rings adjacent the inner portion of the opposite faces of said driving disk, plates outside of the friction rings, spacers extending through some of the openings in the driving disk, ring means clamping the plates against the spacers, said ring means having arcuately extending openings therethrough adapted to register with some of the openings in the driving disk, coil springs in registering openings in the driving disk and the ring means, spring means exerting pressure against the plates to engage the friction rings with the driving disk, and securing means holding the driven disk, spacers, plates, and ring means together to rotate as a unit.

5. In a drive mechanism, a driving disk having arcuately extending openings therethrough, a driven disk, friction rings adjacent the inner portion of the opposite faces of said driving disk, plates outside of the friction rings, spacers extending through some of the openings in said driving disk, clamp rings holding the plates against the ends of the spacers, the inner portion of the clamp ring faces adjacent the spacers being relieved, spring disks outside of the clamp rings exerting pressure against the plates to engage the friction rings with the driving disk, and means securing the plates, spacers, rings, spring disks, and the driven disk together as a unit.

FOREST R. McFARLAND.